Sept. 11, 1956     H. J. HOUCK     2,762,117
METHOD OF FORMING AN INTERLOCKING BUSHING
Filed July 13, 1953
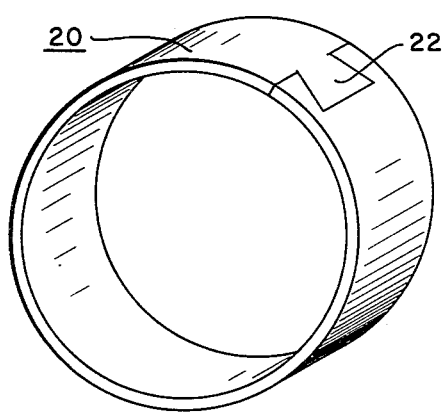
Fig. 1
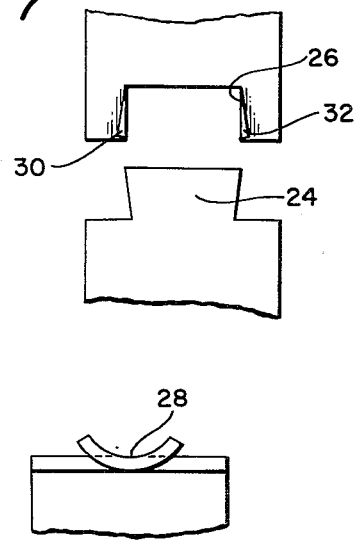
Fig. 7
Fig. 6
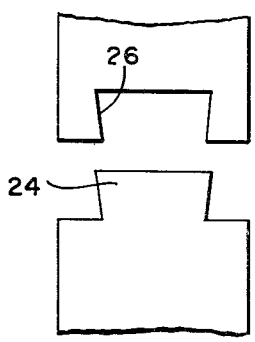
Fig. 2
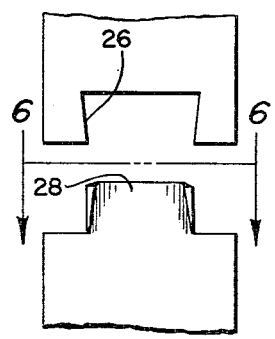
Fig. 3
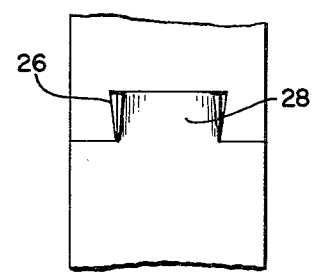
Fig. 4
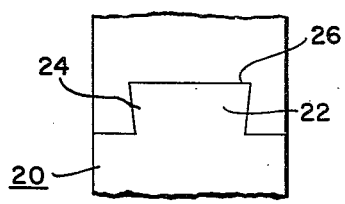
Fig. 5
INVENTOR.
Hooper J. Houck
BY
His Attorney

United States Patent Office 2,762,117
Patented Sept. 11, 1956

2,762,117

METHOD OF FORMING AN INTERLOCKING BUSHING

Hooper J. Houck, Dayton, Ohio, assignor to General Motors Corporation, Detroit, Mich., a corporation of Delaware Application July 13, 1953, Serial No. 367,491

3 Claims. (Cl. 29—521)

This invention relates to bearings and is particularly concerned with a method of making cylindrical bushings of the interlocking type.

It is a basic object of the invention to provide a bearing and method of making same wherein a cylindrical bushing is formed which is interlocked to prevent expansion of the bushing.

In carrying out the above object, it is a further object to provide a blank of bearing metal having dovetail portions at opposite ends thereof including a tongue and a mouth portion, deforming at least a portion of the tongue out of the plane of the remainder of the bushing for narrowing its lateral dimension a predetermined amount, forming the bushing into cylindrical form wherein the deformed tongue fits within the mouth and then, while holding the ends of the bushing in abutting relation, causing the tongue to again be disposed in a single plane whereby the lateral dimension of the tongue is increased to form an interlock with the mouth.

A still further object of the invention is to provide a method for making interlocked cylindrical bushings wherein a blank of suitable material is punched out in flat form to include a dovetail shaped tongue at one end thereof and a complementary shaped mouth or slot at the other end thereof wherein the widest dimension of the tongue is greater than the dimension of the entry to said mouth, then to deform the tongue in a direction at right angles to the major plane of the blank for causing the tongue to curl and thereby reduce its lateral dimension to a dimension less than the dimension of the entry to said mouth, then forming the bushings into cylindrical form by circumferential pressure applied thereto and finally while holding the bushing in cylindrical form, applying lateral pressure to the deformed portions of the tongue and reestablishing its original dimensions whereby the tongue is interlocked in the mouth portion.

Further objects and advantages of the present invention will be apparent from the following description, reference being had to the accompanying drawing, wherein preferred embodiments of the present invention are clearly shown.

In the drawing:

Fig. 1 shows a cylindrical interlock bushing in perspective.

Figs. 2, 3, 4 and 5 are fragmentary views of various progressive steps in the method of forming the interlock used in connection with the bushing shown in Fig. 1.

Fig. 6 is a view taken on line 6—6 of Fig. 3, showing the curl in the tongue.

Fig. 7 is a view similar to Fig. 3, showing a reverse of the operation wherein the entry to the mouth is curled or deformed to permit passage of the tongue therethrough.

In the manufacture of cylindrical bushings, it is desirable to form some type of interlock at the abutting edges of the bushing whereby the bushing is prevented from opening and expanding during use.

This is necessary since in many instances these bushings are more fully supported externally thereof which permits a butt joint bushing to open slightly and thereby destroy the journal fit.

Various means have been provided for forming bushings having an interlock at the abutting portion, however, these methods are difficult to perform and require costly operations which are reflected in the ultimate cost of the bushing.

This invention is directed to a simple means for forming an interlock wherein the interlock may be made with a minimum of effort and expense. Specifically, bearing stock, such as bronze, babbitt on steel, bronze on steel, copper lead on steel, aluminum, aluminum on steel or in fact any suitable bearing material is provided in strip form and blanks are punched therefrom in the flat condition wherein said blanks are predetermined as to dimension so that when the blank is formed in cylindrical form with the two end portions thereof abutting at the joint, a bushing having the desired diameter and bore is provided. In order to form the interlock, it is desirable to form interlocking portions on the two ends preferably in the form of a tongue and mouth or stated differently, a key and slot.

Referring specifically to the drawing, Fig. 1 shows a typical bushing 20 of the interlocking type wherein the interlock is shown at 22. The method of forming this interlock is shown progressively in Figs. 2 through 5. In Fig. 2, which is a fragmentary view of the two end portions of the bushing, an enlarged tongue 24 is shown at one end of the blank whereas reduced entry to the mouth portion 26 is shown at the other end of the blank. These portions can be blanked into the stock in flat form.

The next step is to reduce the effective width of the tongue 24 as noted in Figs. 3 and 6. This is also preferably accomplished while the blank is flat and merely requires the curling or bending of the tongue portion 24 into a tongue portion of the shape shown at 28. In this shape the tongue has its lateral dimension reduced to a width which will pass into the entry to the mouth 26, so that when the bushing is formed circumferentially with the tongue 28, adjacent the mouth 26, further circumferential pressure will cause the tongue 28 to pass through the mouth and bottom therein so that the seam of the bushing is in abutting relation. This position is shown in Fig. 4. With the bushing held in this position, the tongue 28 is next struck or compressed radially or laterally to flatten the same out into its original form as shown at 24 in Fig. 2 whereby the joint of the bushing is a full dovetailed interlock as shown in Fig. 5. In this position, the bushing is held in cylindrical form as noted at 20 so that it cannot expand or open at the seam. It is apparent that other shapes of interlocks may be used with the same principles of interlocking. It is also manifest that a reversal of parts may be resorted to with equal success. One phase of this method is shown in Fig. 7 wherein the tines 30 and 32 of the mouth portion 26 have been deformed upwardly sufficiently to permit entry of the tongue 24. After the tongue is in place and the ends of the bushing are in abutting relation, the tines 30 and 32 are pressed downwardly by radial pressure to form the interlock. This, of course, is merely a reversal of the procedure previously discussed where the tongue is curled. In either instance, the basic concept is to change the dimension of one end or the other of the bushing sufficiently so that the interlocking portions can slide one past the other as the bushing is formed circumferentially whereupon the deformed portion of the interlock is reestablished to its original position for holding the bushing in circumferential form.

In copending application, Serial No. 367,668, filed concurrently herewith, another method for forming interlocked cylindrical bushings is disclosed.

While the embodiments of the present invention as herein disclosed, constitute preferred forms, it is to be understood that other forms might be adopted.

What is claimed is as follows:

1. In a method for forming an interlocking cylindrical bushing, the steps comprising; forming a blank of flat stock having a tongue at one end of the blank and a mouth of complementary shape at the other end of the blank wherein the mouth has a reduced entry opening into an enlarged portion and wherein the tongue has an enlarged end portion with a reduced neck, curling the tongue so as to reduce its lateral dimension sufficiently to permit the tongue to pass through the mouth, forming the flat stock into cylindrical form and simultaneously passing the tongue through the mouth by circumferential pressure, holding the bushing in such cylindrical form and finally flattening the tongue within the mouth by radial pressure applied thereto to reestablish its original shape for interlocking the tongue within the mouth.

2. In a method for forming cylindrical bushings of the interlock type, the steps comprising; providing a flat blank of bearing stock having substantially dovetail interlocking portions at opposite ends thereof, deforming one of said dovetail portions laterally so that the other dovetail portion can be circumferentially interfitted therewith, forming the blank into a cylindrical shape, simultaneously positioning the dovetail portions into interfitting relation one within the other by circumferential pressure applied and then, while holding the bushing in cylindrical form with the dovetail portions in interfitting relation, reestablishing the original shape of said deformed dovetail portion by radial pressure applied thereto for creating an interlock joint on the bushing.

3. In a method for forming an interlocking cylindrical bushing, the steps comprising; stamping a blank of flat stock having the desired developed length for a bushing to be subsequently formed wherein the blank has a tongue at one end thereof and a notch of complementary shape to said tongue at the other end thereof wherein said notch has a reduced dimension entry opening and wherein said tongue has a greater dimension at its extremity than at the joining portion thereof with said blank, troughing the tongue so that portions thereof are out of the general plane of the blank for reducing the lateral dimension of said tongue so that the tongue will pass through the notch, circumferentially forming the flat stock into cylindrical shape and simultaneously passing the troughed tongue into the notch, and finally flattening the tongue within the notch by radial pressure for re-establishing its original shape and for interlocking the tongue within the notch.

References Cited in the file of this patent

UNITED STATES PATENTS

| | | |
|---|---|---|
| 1,213,684 | Osterholm | Jan. 23, 1917 |
| 1,553,675 | Douglas | Sept. 15, 1925 |
| 2,283,918 | Dekome | May 26, 1942 |